US012666203B2

(12) United States Patent
Hyatt

(10) Patent No.: US 12,666,203 B2
(45) Date of Patent: Jun. 23, 2026

(54) COLLIMATED, RESONATING, AND TRACKING SOUND GENERATING SYSTEM

(71) Applicant: Delton Hyatt, Phoenix, AZ (US)

(72) Inventor: Delton Hyatt, Phoenix, AZ (US)

( * ) Notice: Subject to any disclaimer, the term of this patent is extended or adjusted under 35 U.S.C. 154(b) by 345 days.

(21) Appl. No.: 18/352,202

(22) Filed: Jul. 13, 2023

(65) Prior Publication Data

US 2025/0024195 A1      Jan. 16, 2025

(51) Int. Cl.
| | |
|---|---|
| *H04R 1/34* | (2006.01) |
| *F03G 7/00* | (2006.01) |
| *G06V 40/10* | (2022.01) |
| *H04R 3/04* | (2006.01) |
| *H04S 7/00* | (2006.01) |

(52) U.S. Cl.
CPC ............ *H04R 1/345* (2013.01); *F03G 7/025* (2021.08); *G06V 40/10* (2022.01); *H04R 3/04* (2013.01); *H04S 7/303* (2013.01); *G06V 2201/07* (2022.01); *H04R 2201/02* (2013.01)

(58) Field of Classification Search
CPC . H04R 1/345; H04R 1/28; H04R 1/34; H04R 1/32; H04R 3/04; H04R 2201/02; F03G 7/025; G06V 40/10; G06V 2201/07; H04S 7/303
USPC ................................................ 381/160, 337
See application file for complete search history.

(56) References Cited

U.S. PATENT DOCUMENTS

| | | | |
|---|---|---|---|
| 4,235,301 A | 11/1980 | Mitchell | |
| 7,191,022 B1 * | 3/2007 | Kakuhari | H04R 27/00 |
| | | | 381/89 |
| 7,912,234 B1 * | 3/2011 | Graber | H04R 27/04 |
| | | | 381/387 |
| 8,259,965 B2 * | 9/2012 | Chen | H04R 1/345 |
| | | | 381/387 |
| 2014/0023206 A1 * | 1/2014 | Takayasu | H04R 1/403 |
| | | | 381/97 |
| 2023/0370802 A1 * | 11/2023 | Cudak | H04R 3/12 |

FOREIGN PATENT DOCUMENTS

| | | | | |
|---|---|---|---|---|
| WO | WO-2022184595 A1 * | 9/2022 | ............. | H04R 1/345 |

* cited by examiner

*Primary Examiner* — Ahmad F. Matar
*Assistant Examiner* — Sabrina Diaz
(74) *Attorney, Agent, or Firm* — Flener IP & Business Law

(57) ABSTRACT

A sound generating system comprises a parabolic sound reflecting body. A speaker is fixed on a support member that is connected with the parabolic sound reflecting body, wherein the speaker generates sound in a first direction away from the parabolic sound reflecting body and in a second opposite direction toward the parabolic sound reflecting body. The parabolic sound reflecting body is mounted on a stand and configured to rotate around two axes orthogonal to the first direction.

11 Claims, 5 Drawing Sheets

COLLIMATED, RESONATING, AND TRACKING SOUND GENERATING SYSTEM

FIELD OF THE INVENTION

The present invention relates generally to a sound generating system that tracks and directs sound toward a listener. In particular, the present invention relates generally to a system that tracks and directs collimated streams of resonant sound at different base frequencies toward each of the left and right ears of a listener to produce a binaural beats effect for the listener.

BACKGROUND

Resonant sound as the terminology is used herein refers to sound having a frequency spectrum that includes a base frequency and many harmonics of the base frequency. Such sound is typically identifiable as being full and rich because of the perceived effect of the harmonics blending together, and is traditionally produced using a sound source comprising one or more tuning forks, or bowls, or drums, or gongs, where the "resonant" terminology comes from the sound source being struck and vibrating at its own resonant vibrational frequencies.

It has been found that two sources of sound, both with frequencies lower than about 1500 Hz and having slightly different frequencies, $f_1$ and $f_2$, when presented to a listener's left and right ears, are perceived by the listener's brain as a pulsed or beating sound having a frequency that is the difference $(f_1-f_2)$ of the source frequencies. Harmonics of the two sources of sound can further produce additional beats perceived by the listener's brain. The beating sounds perceived by the listener's brain are commonly referred to as binaural beats, which are believed to stimulate portions of the listener's brain depending on the range of the perceived beat frequencies that correspond to the frequencies of brainwaves. It is believed that binaural beats produced by the sound sources and their harmonics, depending on the frequency range of the beats can reduce stress, anxiety, and pain, help with sleep, and increase focus and creativity for the listener. It is also believed that binaural beats can be used in therapeutic treatment regimes, for example without limitation, to improve or slow the progression of Parkinson's and other neuro-degenerative diseases, wherein the efficacy of the treatment may also depend on the frequency of the binaural beats.

Typically, binaural beats are provided to a listener via headphones or ear pods. A need therefore exists for a device for generating binaural beats without the need for headphones. It would be beneficial if the device could generate the binaural beats from two streams of any sort of resonant sound or music including predetermined base frequencies and harmonics thereof. It would be further beneficial if the two streams of resonant sound could be collimated and specifically directed at a listener's left and right ears to produce the perceived binaural beats in the listener's brain. It would be still further beneficial if the two streams of resonant sound could be directed to produce the binaural beats for a non-stationary listener. A need therefore exists for a system that can track a listener and direct collimated resonant sound to the listener's left and right ears.

SUMMARY OF THE INVENTION

In one aspect of the invention, a sound generating system comprises a parabolic sound reflecting body. A speaker is fixed on a support member that is connected with the parabolic sound reflecting body, wherein the speaker generates sound in a first direction away from the parabolic sound reflecting body and in a second opposite direction toward the parabolic sound reflecting body. The parabolic sound reflecting body is mounted on a stand and configured to rotate around two axes orthogonal to the first direction.

In another aspect of the invention, a sound generating system comprises a parabolic sound reflecting body, and a speaker fixed on a support member that is connected with the parabolic sound reflecting body. The sound generating system further comprises a stand upon which the parabolic sound reflecting body is mounted, wherein the speaker generates sound in a first direction away from the parabolic sound reflecting body and in a second opposite direction toward the parabolic sound reflecting body. The parabolic sound reflecting body is configured to rotate around two axes orthogonal to the first direction via one or more rotational actuators disposed on the stand. An optical sensor is disposed on the support member or the stand. A processor is disposed in electrical communication with the optical sensor and the one or more rotational actuators. The processor is configured to receive optical input from the optical sensor, process the optical input to target recognition of a human ear, to determine a target direction pointing toward the human ear, and command the one or more rotational actuators to rotate the parabolic sound reflecting body around the two axes orthogonal to the first direction so that the first direction coincides with the target direction.

In a further aspect of the invention, a sound generating system comprises a first subassembly, comprising a first parabolic sound reflecting body, and a first speaker fixed on a first support member that is connected with the first parabolic sound reflecting body. The first speaker generates sound in a first direction away from the first parabolic sound reflecting body and in a second opposite direction toward the first parabolic sound reflecting body. The first parabolic sound reflecting body is mounted on a first stand and configured to rotate around two axes orthogonal to the first direction via one or more first rotational actuators disposed on the first stand. A first optical sensor is disposed on the first support member or the first stand. The sound generating system further comprises a second subassembly, comprising a second parabolic sound reflecting body, and a second speaker fixed on a second support member that is connected with the second parabolic sound reflecting body. The second speaker generates sound in a third direction away from the second parabolic sound reflecting body and in a fourth opposite direction toward the second parabolic sound reflecting body. The second parabolic sound reflecting body is mounted on a second stand and configured to rotate around two axes orthogonal to the third direction via one or more second rotational actuators disposed on the second stand. A second optical sensor is disposed on the second support member or the second stand. A processor is disposed in electrical communication with the first and second optical sensors and the one or more first and second rotational actuators, and wherein the processor is configured to receive first optical input from the first optical sensor, receive second optical input from the second optical sensor, process the first optical input to target recognition of a left human ear, and to determine a first target direction pointing toward the left human ear, process the second optical input to target recognition of a right human ear, and to determine a second target direction pointing toward the right human ear, command the one or more first rotational actuators to rotate the first parabolic sound reflecting body so that the first direction coincides with the first target direction, and command the one or more second rotational actuators to rotate the second parabolic sound reflecting body so that the third direction coincides with the second target direction.

Additional aspects and advantages of the present disclosure will become readily apparent to those skilled in this art from the following detailed description, wherein only illustrative embodiments of the present disclosure are shown and described.

BRIEF DESCRIPTION OF THE DRAWINGS

Other aspects and advantages of the present invention will become apparent upon consideration of the following detailed description, wherein similar structures have similar reference numerals.

DETAILED DESCRIPTION

Figure 1:
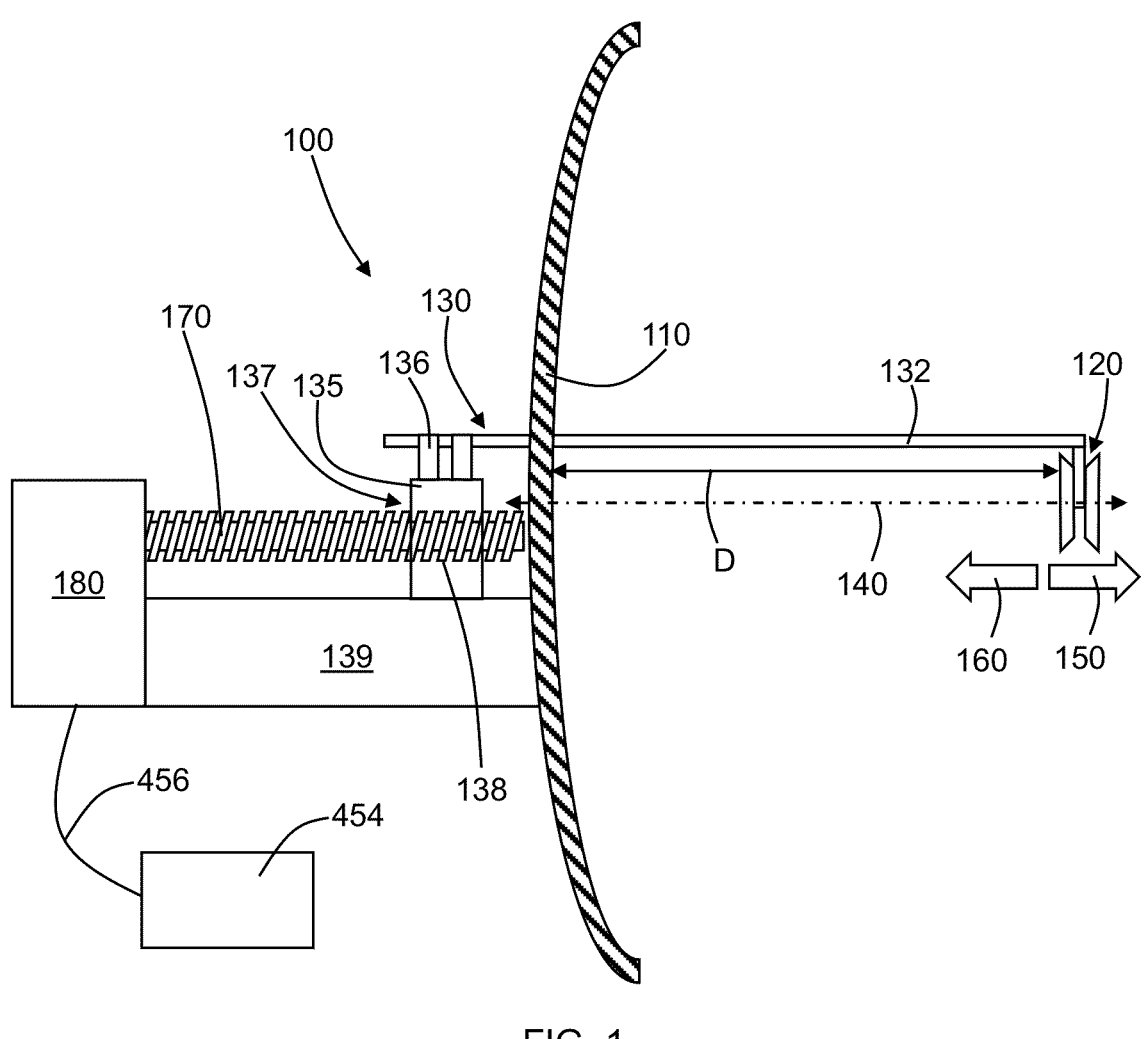
FIG. 1 illustrates a schematic diagram of a tunable resonance generator according to an embodiment.

The following detailed embodiments presented herein are for illustrative purposes. That is, these detailed embodiments are intended to be exemplary of the present invention for the purposes of providing and aiding a person skilled in the pertinent art to readily understand how to make and use of the present invention. In the descriptions that follow identical reference numerals used to describe components of different disclosed embodiments refer to identical components that may be part of the different disclosed embodiments.

Referring to FIG. 1, in an embodiment a tunable resonance generator (TRG) 100 comprises a sound reflecting body 110, which is shown in cross-section for clarity in FIG. 1. In an embodiment a speaker 120 is fixed on a support member 130 that is disposed through or connected with the sound reflecting body 110. In an embodiment the sound reflecting body 110 has a bowl shape as shown. In other embodiments the sound reflecting body 110 is a parabolic bowl, a non-parabolic bowl having a cross-sectional shape other than what is shown, or a flat plate.

In an embodiment the speaker 120 is fixed on the support member 130 so that a center of the speaker 120 is aligned with a center of the sound reflecting body 110 as indicated by a common centerline 140 passing through both the speaker 120 and the sound reflecting body 110. In other embodiments a centerline of the speaker 120 is not aligned with a centerline of the sound reflecting body 110. In an embodiment the speaker 120 is a conventional electrically driven speaker having a magnet and a coil driving vibrating diaphragms, but in other embodiments the speaker 120 can be any sort of speaker as is known in the art. In an embodiment the speaker 120 generates sound in a first direction indicated by arrow 150 away from the sound reflecting body 110 and in a second opposite direction indicated by arrow 160 toward the sound reflecting body 110.

In an embodiment the support member 130 is configured to move relative to the sound reflecting body 110 to adjust a distance D between the speaker 120 and the sound reflecting body 110. In an embodiment the support member 130, for example without limitation, includes a supporting rod 132 extending from a sliding stage 135, which is shown transparently in FIG. 1. In an embodiment the sliding stage 135 includes a passage 137 disposed through it, wherein the passage 137 has an interior gear or threads 138. In an embodiment the supporting rod 132 is attached to the sliding stage 135 by a clamp or fasteners 136 or the like, but in other embodiments the supporting rod 132 is integral with the sliding stage 135.

In an embodiment the TRG 100 further comprises a driven gear or threaded rod 170 wherein the interior gear or threads 138 of the sliding stage 135 is configured to mesh with the driven gear or threaded rod 170. The sliding stage 135 is disposed in contact with a slide base 139 so that when the driven gear or threaded rod 170 is rotated around its longitudinal axis, the interaction between the driven gear or threaded rod 170 and the interior gear or threads 138 forces the sliding stage 135 to move along the driven gear or threaded rod 170. Movement of the sliding stage 135 along the driven gear or threaded rod 170 moves the support member 130 relative to the sound reflecting body 110, thereby moving the speaker 120 toward or away from the sound reflecting body 110. Therefore, by turning the driven gear or threaded rod 170, the distance D can be made larger or smaller. In an embodiment a stepper motor 180, for example, is connected to and controlled by a user interface 454, for example via wires 456 or wirelessly via any wireless communication protocol as is known in the art. In an embodiment the stepper motor 180 is provided to precisely drive the driven gear or threaded rod 170, and thereby precisely adjust the distance D. In other embodiments the distance D can be adjusted by manually turning the driven gear or threaded rod 170.

Figure 2:
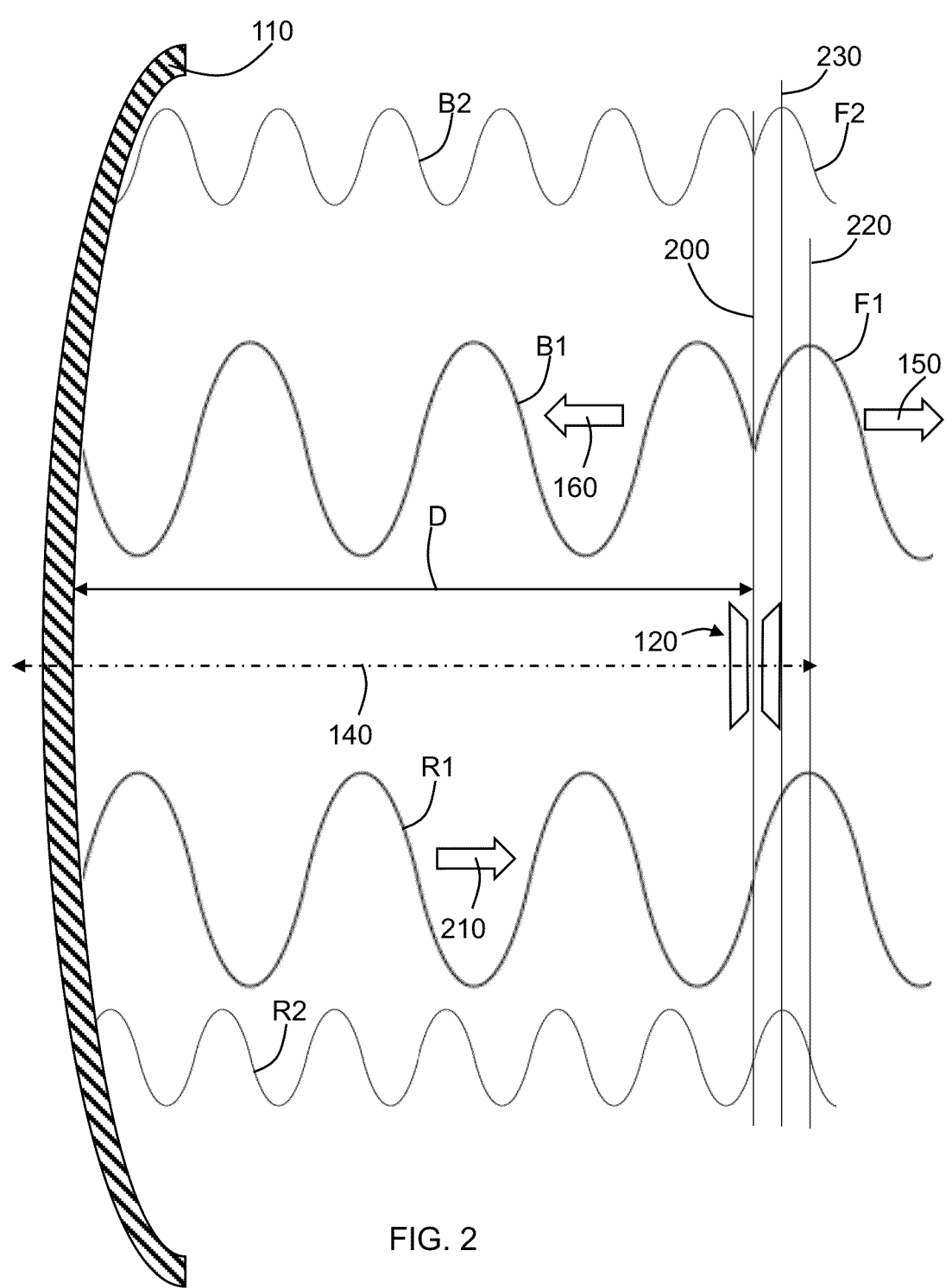
FIG. 2 illustrates the constructive addition of sound waves directed away from and toward a sound reflecting body according to an embodiment.

Referring to FIG. 2, the sound reflecting body 110 and the speaker 120 are shown without the supporting structure illustrated in FIG. 1. Without being held to theory, sound comprises pressure waves that propagate through the air and that can be represented in a sinusoidal representation as pressure waves F1, F2, B1, B2, R1, and R2 in FIG. 2. Assuming for ease of explanation that the speaker 120 has zero effective width along the centerline 140, sound generated by the speaker 120 emanates from the reference line 200. Then for example, the speaker 120 generates sound including a sound wave F1 of a given frequency in a first direction indicated by arrow 150 away from the sound reflecting body 110 and a sound wave B1 of the given frequency in a second opposite direction indicated by arrow 160 toward the sound reflecting body 110. The speaker 120 can generate a single frequency, multiple distinct frequencies, or a continuous spectrum of frequencies that may take the audible form of a single tone, multiple tones, or music of any sort or style in both the first and second directions 150, 160.

Again, without being held to theory, the sound wave B1 will reflect from the sound reflecting body 110 and propagate back toward the speaker 120 as reflected wave R1 traveling in the direction of arrow 210. If the distance D matches the wavelength or a multiple of the wavelength of the sound wave B1, then the amplitudes of the sound waves F1 and R1 will be constructively additive at the given frequency, as can be seen by the peaks of the sound waves F1 and R1 aligning along reference line 220 in FIG. 2.

Similarly, FIG. 2 further illustrates sound waves F2, B2, and R2, traveling in the same directions as F1, B1, and R1, respectively, and having, for example, twice the frequency of F1, B1, and R1. Thus, the sound waves F2, B2, and R2 are the first higher harmonic of the sound waves F1, B1, and R1. Again, if the distance D matches the wavelength or a multiple of the wavelength of the frequency of the sound wave B2, then the amplitudes of the sound waves F2 and R2 will be constructively additive at the first higher harmonic frequency, as can be seen by the peaks of the sound waves F2 and R2 aligning along reference line 230 in FIG. 2. Without being held to theory or showing additional higher harmonic sound waves on FIG. 2, the other higher harmonics will also add constructively if the distance D matches the wavelength or a multiple of the wavelength of the frequency of the sound waves. Additionally, the lower harmonics of sound waves will also add constructively (for example, B1 is a lower harmonic of B2) so long as the distance D matches the wavelength or a multiple of the wavelength of the lower harmonic sound waves.

Of course, in reality the speaker 120 has a finite width, but any source offset caused by the finite width can be accounted for by adjustment of the distance D so that the sound reflected from the sound reflecting body 110 adds constructively with the sound directed away from the sound reflecting body 110 for any desired predetermined frequency, where a change in the distance D between the speaker 120 and the sound reflecting body 110 changes the predetermined frequency.

If each predetermined frequency is considered to be a base frequency, then this constructive addition of the base frequencies and their harmonics boosts the sound levels for the constructively added frequencies in the generated sound, where the affected frequencies are tunable by adjusting the distance D. In fact, without being held to theory, the base frequency and its harmonics can be tuned to any frequency as desired by adjusting the distance D. In an embodiment the predetermined base frequency is in a range of frequencies from about 100 Hz to about 1200 Hz. In an embodiment the predetermined base frequency is about 200 Hz.

Further, without being held to theory, the material properties of the sound reflecting body 110, can have an effect on the efficiency of the reflection of the base frequency and the harmonics thereof. For example, without limitation, the stiffness, thickness, material density, surface hardness, and diameter of the sound reflecting body 110 can be factors in how strong the reflected sound waves are both for the base frequency and the harmonics thereof, which influences the richness and fullness of the overall resonant sound that is produced.

Figure 3:
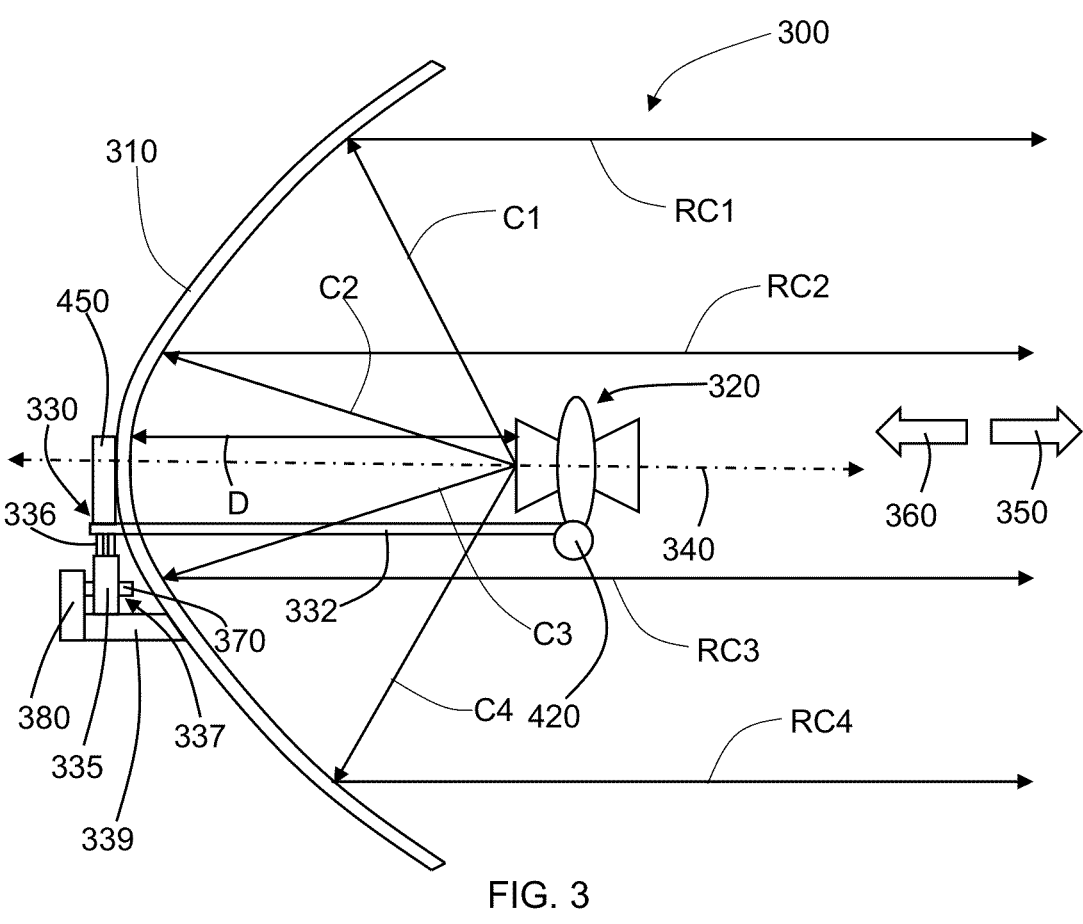
FIG. 3 illustrates a schematic diagram of a resonance generator according to an embodiment.

Referring now to FIG. 3, in an embodiment a resonance generator 300 includes a parabolic sound reflecting body 310. In an embodiment a speaker 320 is fixed on a support member 330 that is disposed through or connected with the parabolic sound reflecting body 320 so that a center of the speaker 320 is aligned with a center of the sound reflecting body 310 as indicated by a common centerline 340 passing through both the speaker 320 and the sound reflecting body 310. In an embodiment the speaker 320 is a conventional speaker like speaker 120, but in other embodiments the speaker 120 can be any sort of speaker as is known in the art that generates sound in a first direction indicated by arrow 350 away from the parabolic sound reflecting body 310 and in a second opposite direction indicated by arrow 360 toward the parabolic sound reflecting body 310. Again, the speaker 120 can generate a single frequency, multiple distinct frequencies, or a continuous spectrum of frequencies that may take the audible form of a single tone, multiple tones, or music of any sort or style in both the first and second directions 350, 360.

An embodiment the support member 330 is configured to move relative to the parabolic sound reflecting body 310 to adjust a distance D between the speaker 320 and the parabolic sound reflecting body 310. In an embodiment the support member 330, for example without limitation, includes a supporting rod 332 extending from a sliding stage 335. In an embodiment the sliding stage 335 includes a passage 337 disposed through it, wherein the passage 337 has an interior gear or threads (not labeled in FIG. 3 for clarity, but shown as reference numeral 138 in FIG. 1). In an embodiment the supporting rod 332 is attached to the sliding stage 335 by a clamp or fasteners 336 or the like, but in other embodiments the supporting rod 332 is integral with the sliding stage 335.

In an embodiment the resonance generator 300 further comprises a driven gear or threaded rod 370 (exactly like the driven gear or threaded rod 170 shown in FIG. 1) wherein the interior gear or threads (not shown in FIG. 3) of the sliding stage 335 is configured to mesh with the driven gear or threaded rod 370. In an embodiment the sliding stage 335 is disposed in contact with a slide base 339 so that when the driven gear or threaded rod 370 is rotated around its longitudinal axis, the interaction between the driven gear or threaded rod 370 and the interior gear or threads (not shown in FIG. 3) forces the sliding stage 335 to move along the driven gear or threaded rod 370. Movement of the sliding stage 335 along the driven gear or threaded rod 370 moves the support member 330 relative to the parabolic sound reflecting body 310, thereby moving the speaker 320 toward or away from the parabolic sound reflecting body 310. Therefore, by turning the driven gear or threaded rod 370, the distance D can be made larger or smaller. In an embodiment a stepper motor 380, for example, as connected to and controlled by a user interface (not shown), is provided to precisely drive the driven gear or threaded rod 370, and thereby precisely adjust the distance D. In other embodiments the distance D can be adjusted by manually turning the driven gear or threaded rod 370.

The resonance generator 300 operates like the TRG 100 as fully explained hereinabove with regard to FIG. 2 to constructively add the amplitudes for a predetermined base frequency and harmonics thereof of the sound generated by the speaker 320 in the first direction 350 and the sound generated by the speaker 320 in the second direction 360 and reflected from the parabolic sound reflecting body 310. As noted above, this combined and constructively additive sound from two sources is referred to as "resonant sound." Like the TRG 100, in an embodiment of the resonance generator 300 the predetermined base frequency for the resonant sound is in a range of frequencies from about 100 Hz to about 1200 Hz, and the amplitudes are constructively additive at the predetermined base frequency and one or more harmonics thereof.

In an embodiment the resonance generator 300 is part of a system that can track a target and point toward the target to deliver a stream of collimated resonant sound to the target. Although the resonance generator 300 is tunable as described hereinabove, in one mode of operation during tracking the frequency at which resonance is being generated is fixed. The particular parabolic shape of the parabolic sound reflecting body 310 allows for the production of the collimated stream of the resonant sound. Still referring to FIG. 3, sound streams propagating from the speaker 320, illustrated by arrows C1, C2, C3, and C4 are reflected by the parabolic sound reflecting body 310 so that the directions of propagation of the four reflected sound streams RC1, RC2, RC3, and RC4 are parallel and in the first direction 350. When combined with the sound propagating from the speaker 320 in the first direction 350, a collimated stream of resonant sound is produced. The collimated stream of resonant sound thus produced can be aimed at the target by rotating the parabolic sound reflecting body 310 around two axes orthogonal to the first direction 350 in the direction of the target.

Figure 4:
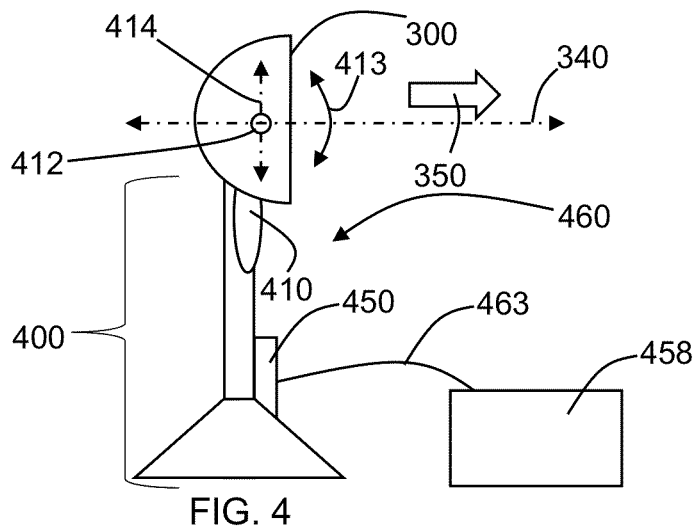
FIG. 4 illustrates a schematic diagram of a subassembly or resonance generator tracking unit according to an embodiment.
Figure 5:
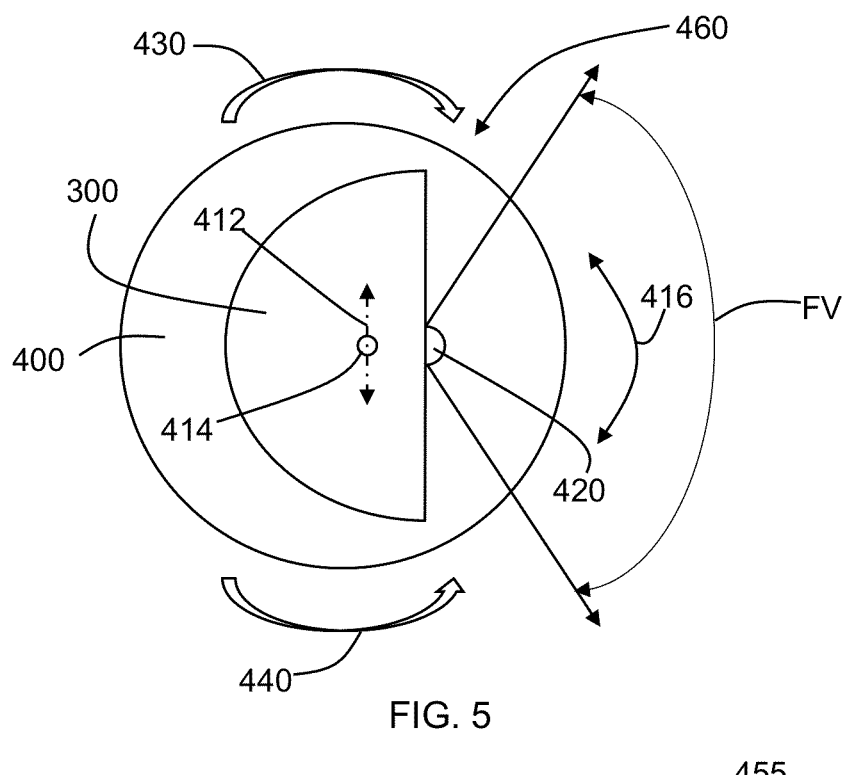
FIG. 5 illustrates a schematic diagram of the subassembly or resonance generator tracking unit of FIG. 4 showing an exemplary field of view.

Referring to FIGS. 4 and 5, in an embodiment the resonance generator 300 is mounted on a stand 400 and configured to rotate relative to the stand 400 around first and second axes 412, 414 orthogonal to the first direction 350. For example, in an embodiment the resonance generator 300 is configured to rotate around a first axis 412 orthogonal to the first direction 350. In FIG. 4, the first axis 412 is shown end-on coming directly out of the page as a circle. Rotation of the resonance generator 300 around the first axis 412 as indicated by the double arrow labeled 413 would result in a change in angle of the first direction 350 relative to the stand 400—effectively allowing the first direction 350 to be directed higher or lower relative to the stand 400.

Referring to FIG. 5, the second axis 414 is shown end-on coming directly out of the page as a circle. Rotation of the resonance generator 300 around the second axis 414 as indicated by the double arrow labeled 416 would result in a change of the first direction 350—effectively allowing the first direction 350 to be directed to the left or to the right relative to the stand 400. In an embodiment the resonance generator 300 is mounted on the stand 400 and configured to rotate relative to the stand 400 around the first axis 412 and/or the second axis 414 via one or more rotational actuators 410 disposed on the stand 400.

In an embodiment the resonance generator 300 is mounted on the stand 400 via the slide base 339; however, in other embodiments the resonance generator 300 is mounted on the stand 400 via another component that allows the resonance generator 300 to be mounted without restricting adjustment of the distance D. In another embodiment, the resonance generator 300 is constructed having a non-adjustable fixed distance D that is selected to produce resonant sound at a predetermined base frequency and its harmonics. In an embodiment the resonance generator can rotate to the right relative to the stand 400 as illustrated by arrow 430, and can also rotate to the left relative to the stand 400 as illustrated by arrow 440.

Referring to FIGS. 3 and 5, in an embodiment an optical sensor 420 is disposed on the support member 330, for example, on the supporting rod 332. In an embodiment the optical sensor 420 has a field of view, FV, for example, as illustrated by the arc labeled FV in FIG. 5. Although shown from above in two dimensions in FIG. 5, the field of view, FV, is in fact three dimensional having the extent of a cone extending from the optical sensor 420. In other embodiments the optical sensor 420 can be mounted on the parabolic sound reflecting body 310 and having the field of view, FV, facing in a direction toward the speaker 320 and generally parallel to the centerline 340. In other embodiments the field of view, FV, can span a larger or a smaller arc (cone) than is illustrated in FIG. 5.

In an embodiment the optical sensor 420 is disposed on another part of the resonance generator 300 or on the one or more actuators 410 so that when the resonance generator 300 is turned to point at a target, the field of view, FV, of the optical sensor encompasses the target. Regardless of exactly where the optical sensor 420 is mounted, it should be noted that the displacement of the optical sensor 420 relative to the centerline 340 is taken into account by the facial recognition software (described hereinbelow) when determining the target direction for pointing the parabolic sound reflecting body 310. In an embodiment the one or more rotational actuators 410 can be commanded to rotate the resonance generator 300 so that a suitable target comes into the field of view, FV, as described below.

Figure 7:
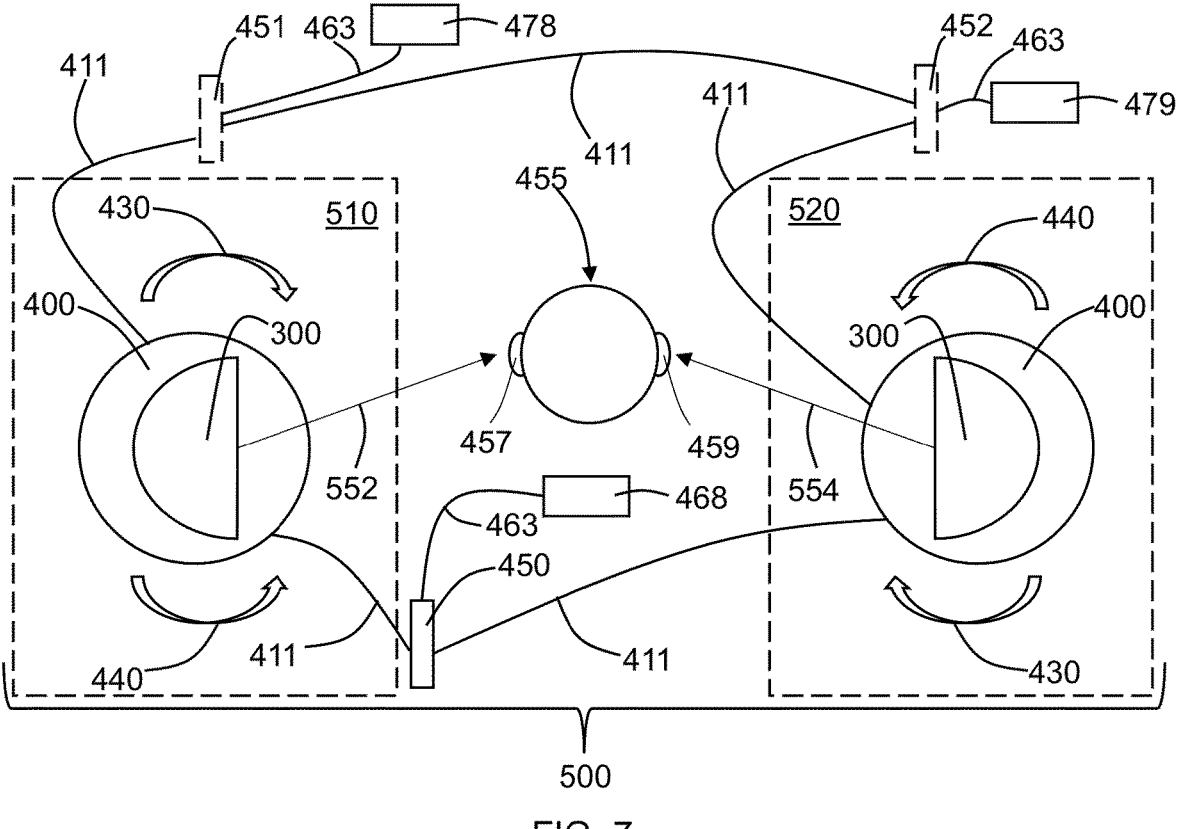
FIG. 7 illustrates a schematic diagram of a sound generating system comprising two subassemblies or resonance generator tracking units according to an embodiment.

In an embodiment, a computer or processor 450 is disposed on the support member 330 or on the stand 400, or remote from the resonance generator 300 as shown in FIG. 7. Regardless of where it is mounted, in an embodiment the processor 450 is in electrical communication with the stepper motor 380, the one or more actuators 410, and the optical sensor 420, for example, via wires 411 or wirelessly via any wireless communication protocol as is known in the art. In an embodiment the processor 450 includes a local non-volatile memory in which software can be stored for execution on the processor 450. In an embodiment the processor 450 can communicate with the internet or with other electronic devices via a wi-fi or Bluetooth connection, or via any wired or wireless communication protocol as is known in the art. In an embodiment the processor 450 can be connected with a user interface 458, for example a keyboard, touchscreen, and/or graphical user interface via wires 463 or wirelessly via any wireless communication protocol as is known in the art. The user interface 458 allows for inputs of parameters and other control commands for the stepper motor 380, the one or more actuators 410, the optical sensor 420, and/or the processor 450 to be provided to the processor 450.

Figure 6:
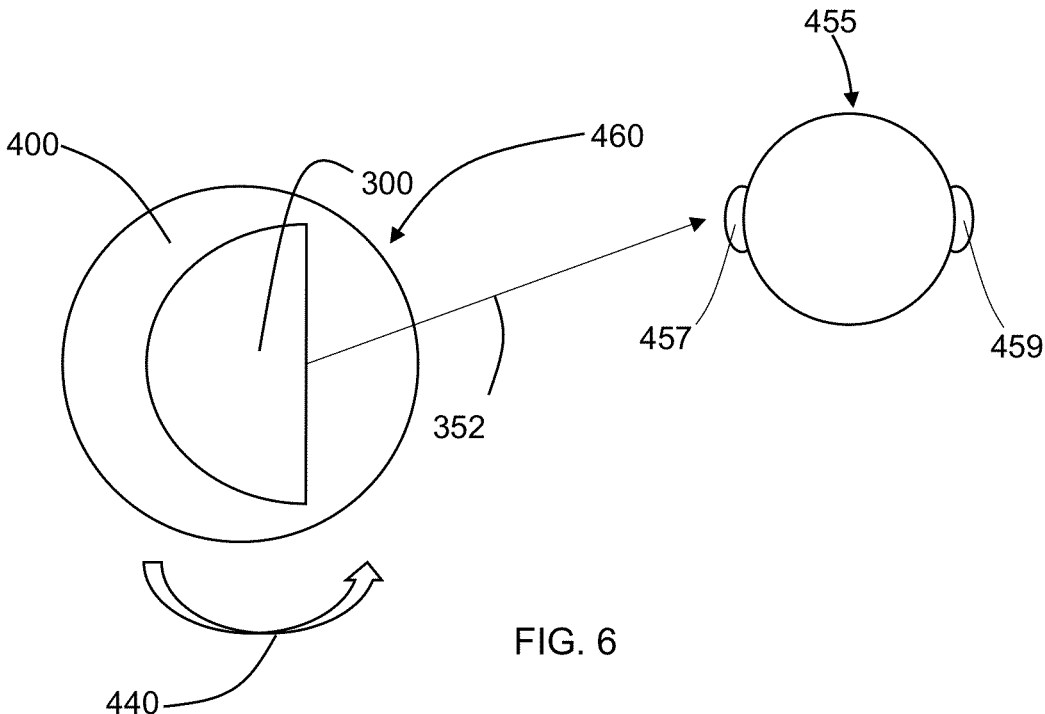
FIG. 6 illustrates a schematic diagram of a subassembly or resonance generator tracking unit in relation to a target direction according to an embodiment.

In an embodiment the processor 450 loads and executes facial recognition software that can be stored in the local non-volatile memory or on a device in communication with the processor 450. In an embodiment the facial recognition software is manufactured, for example without limitation, by Chetu, Inc. of Sunrise, Florida, by Canto, Inc. of San Francisco, California, by Rank One Computing of Denver, Colorado, by AUIOTIX of Nicosia, Cyprus, Banuba of Dubai, United Arab Emirates, Jibble of Kuala Lumpur, Malaysia, or by another manufacturer. Referring to FIGS. 4-6, in an embodiment the processor 450 running the facial recognition software receives optical input from the optical sensor 420. If a suitable target, for example, a human face or head 455 is within the field of view, FV, the facial recognition software recognizes the features of the human face or head 455 including left 457 and right 459 ears (see FIG. 6).

In an embodiment the processor 450 processes the optical input through the facial recognition software to determine a target direction 352 that points at the human ear 457, 459. Upon establishing the target direction 352, the processor 450 commands the one or more rotational actuators 410 to rotate the resonance generator 300 around the first and second axes 412, 414 orthogonal to the first direction 350 relative to the stand 400, for example to the left 440 as illustrated in FIG. 6, so that the first direction 350 (see FIG. 3) coincides with the target direction 352. When the resonance generator 300 is so oriented, the collimated stream of resonant sound produced by the resonance generator 300 is directed in the target direction 352 at the human ear 457, 459.

For reference in the following description, the resonance generator 300 mounted on the stand 400 and all of the associated components such as the processor 450, the optical sensor 420 as illustrated in FIG. 4 and as described in regard to FIGS. 3-6 is defined to be a subassembly 460, or a resonance generator tracking unit 460. Referring to FIG. 7, in an embodiment a sound generating system 500 comprises a first subassembly or resonance generator tracking unit 510 and a second subassembly or resonance generator tracking unit 520, wherein each of the first and second subassemblies or resonance generator tracking units 510 and 520 is similar to the subassembly or resonance generator tracking unit 460 described hereinabove with regard to FIGS. 3-6. In this context, common reference numerals are used to describe common elements in the first and second resonance generator tracking units 510, 520 and the resonance generator tracking unit 460. In the embodiment of the sound generating system 500, for example, the first resonance generator tracking unit 510 is configured to target a human left ear 457, and the second resonance generator tracking unit 520 is configured to target a human right ear 459.

Still referring to FIG. 7, in an embodiment of the sound generating system 500, a single processor 450 receives optical input from the optical sensors 420 (see FIG. 5) of both of the first and second resonance generator tracking units 510, 520. In an embodiment the processor 450 is electrically connected to a user interface 468 via wires 463 or wirelessly via any wireless communication protocol as is known in the art, and is configured to receive optical inputs from the optical sensors 420 of the first and second resonance generator tracking units 510, 520, process the optical inputs through the facial recognition software running on the processor 450 to target recognition of the left and right human ears 457, 459, and to determine first and second target directions 552, 554 pointing respectively toward the left and right human ears 457, 459. Upon determination of the first and second target directions 552, 554, the processor 450 commands the one or more rotational actuators 410 of the first resonance generator tracking unit 510 to rotate the parabolic sound reflecting body 310 of the first resonance generator tracking unit 510 so that the first direction 350 of the first resonance generator tracking unit 510 coincides with the first target direction 552, and the processor 450 commands the one or more rotational actuators 410 of the second resonance generator tracking unit 520 to rotate the parabolic sound reflecting body 310 of the second resonance generator tracking unit 520 so that the first direction 350 of the second resonance generator tracking unit 520 coincides with the second target direction 554.

Still referring to FIG. 7, in another embodiment of the sound generating system 500, each of the first and second resonance generator tracking units 510, 520 is individually equipped with a processor 451, 452, respectively (see dashed elements 451 and 452 in FIG. 7). In this embodiment the processor 451 is electrically connected to a user interface 478 via wires 463 or wirelessly via any wireless communication protocol as is known in the art, and the processor 452 is electrically connected to a user interface 479 via wires 463 or wirelessly via any wireless communication protocol as is known in the art. In this embodiment the processor 451 of the first resonance generator tracking unit 510 is configured to receive optical input from the optical sensor 420 of the first resonance generator tracking unit 510, process the optical input through the facial recognition software running on the processor 451 to target recognition of the left human ear 457, and to determine a first target direction 552 pointing toward the left human ear 457. Upon determination of the first target direction 552, the processor 451 commands the one or more rotational actuators 410 of the first resonance generator tracking unit 510 to rotate the parabolic sound reflecting body 310 of the first resonance generator tracking unit 510 so that the first direction 350 of the first resonance generator tracking unit 510 coincides with the first target direction 552.

Similarly, in this embodiment the processor 452 of the second resonance generator tracking unit 520 is configured to receive optical input from the optical sensor 420 of the second resonance generator tracking unit 520, process the optical input through the facial recognition software running on the processor 452 to target recognition of the right human ear 459, and to determine a second target direction 554 pointing toward the right human ear 459. Upon determination of the second target direction 554, the processor 452 commands the one or more rotational actuators 410 of the second resonance generator tracking unit 520 to rotate the parabolic sound reflecting body 310 of the second resonance generator tracking unit 520 so that the first direction 350 of the second resonance generator tracking unit 520 coincides with the second target direction 554. In this embodiment the first and second processors 451, 452 can be in communication with one another or with another processor (not shown) via wires 411 or wirelessly as described hereinabove to coordinate control of the sound generating system 500.

INDUSTRIAL APPLICABILITY

A sound generating system produces two streams of collimated resonant sound having a difference in base frequency, utilizes facial recognition software to recognize the left and right ears of a user, and delivers the two sound streams to the left and right ears of the user, wherein the user's brain perceives the two sound streams as binaural beats having a beat frequency that is the difference of the base frequencies. The base frequencies can be tuned to create a binaural beat frequency believed to be efficacious for treatment of physical and mental diseases. The sound generating system can be manufactured in industry for use by individuals, therapists, and other care givers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

I claim:

1. A sound generating system, comprising:
a parabolic sound reflecting body; and
a speaker fixed on a support member that is connected with the parabolic sound reflecting body;
wherein the speaker generates sound in a first direction away from the parabolic sound reflecting body and in a second opposite direction toward the parabolic sound reflecting body; and wherein the parabolic sound reflecting body is mounted on a stand and configured to rotate around two axes orthogonal to the first direction;

wherein amplitudes are constructively additive for a predetermined base frequency and one or more harmonics thereof of the sound generated by the speaker in the first direction and the sound generated by the speaker in the second direction and reflected from the parabolic sound reflecting body, and wherein a change in a distance between the speaker and the parabolic sound reflecting body changes the predetermined frequency for which the amplitudes are constructively additive.

2. The system of claim 1, wherein the predetermined base frequency is in a range of frequencies from about 100 Hz to about 1200 Hz.

3. The system of claim 1, wherein the parabolic sound reflecting body is configured to rotate around the two axes orthogonal to the first direction via one or more rotational actuators disposed on the stand.

4. A sound generating system, comprising:

first and second systems, each comprising:

a parabolic sound reflecting body; and a speaker fixed on a support member that is connected with the parabolic sound reflecting body;

wherein the speaker generates sound in a first direction away from the parabolic sound reflecting body and in a second opposite direction toward the parabolic sound reflecting body:

wherein the parabolic sound reflecting body is mounted on a stand and configured to rotate around two axes orthogonal to the first direction; and wherein the parabolic sound reflecting body is configured to rotate around the two axes orthogonal to the first direction via one or more rotational actuators disposed on the stand;

an optical sensor disposed on the support member or the stand;

a processor disposed in electrical communication with the optical sensor and the one or more rotational actuators, the processor configured to:

receive optical input from the optical sensor;

process the optical input to target recognition of a human ear, and to determine a target direction pointing toward the human ear; and command the one or more rotational actuators to rotate the parabolic sound reflecting body so that the first direction coincides with the target direction;

wherein the processor of the first system is configured to:

receive optical input from the optical sensor of the first system;

process the optical input from the optical sensor of the first system to target recognition of a left human ear, and to determine a first target direction pointing toward the left human ear; and command the one or more rotational actuators of the first system to rotate the parabolic sound reflecting body of the first system so that the first direction of the first system coincides with the first target direction; and wherein the processor of the second system is configured to:

receive optical input from the optical sensor of the second system;

process the optical input from the optical sensor of the second system to target recognition of a right human ear, and to determine a second target direction pointing toward the right human ear; and command the one or more rotational actuators of the second system to rotate the parabolic sound reflecting body of the second system so that the first direction of the second system coincides with the second target direction.

5. The sound generating system of claim 4, wherein:

in the first system, amplitudes are constructively additive for a first predetermined base frequency and one or more harmonics thereof of the sound generated by the speaker of the first system in the first direction and the sound generated by the speaker of the first system in the second direction and reflected from the parabolic sound reflecting body of the first system, and wherein a change in a distance between the speaker of the first system and the parabolic sound reflecting body of the first system changes the first predetermined base frequency; and in the second system, amplitudes are constructively additive for a second predetermined base frequency and one or more harmonics thereof of the sound generated by the speaker of the second system in the first direction and the sound generated by the speaker of the second system in the second direction and reflected from the parabolic sound reflecting body of the second system, and wherein a change in a distance between the speaker of the second system and the parabolic sound reflecting body of the second system changes the second predetermined base frequency.

6. The sound generating system of claim 5, wherein:

the first predetermined base frequency is in a range of frequencies from about 100 Hz to about 1200 Hz;

the second predetermined base frequency is in a range of frequencies from about 100 Hz to about 1200 Hz; and the first predetermined base frequency and the second predetermined base frequency are different frequencies, wherein the difference between the first and second base frequencies is less than or equal to 50 Hz.

7. The sound generating system of claim 6, wherein:

the first predetermined base frequency is about 428 Hz; and the second predetermined base frequency is about 436 Hz.

8. A sound generating system, comprising:

a first subassembly, comprising:

a first parabolic sound reflecting body; and a first speaker fixed on a first support member that is connected with the first parabolic sound reflecting body;

wherein the first speaker generates sound in a first direction away from the first parabolic sound reflecting body and in a second opposite direction toward the first parabolic sound reflecting body;

wherein the first parabolic sound reflecting body is mounted on a first stand and configured to rotate around two axes orthogonal to the first direction via one or more first rotational actuators disposed on the first stand; and a first optical sensor disposed on the first support member or the first stand; and a second subassembly, comprising:

a second parabolic sound reflecting body; and a second speaker fixed on a second support member that is connected with the second parabolic sound reflecting body;

wherein the second speaker generates sound in a third direction away from the second parabolic sound reflecting body and in a fourth opposite direction toward the second parabolic sound reflecting body;

wherein the second parabolic sound reflecting body is mounted on a second stand and configured to rotate around two axes orthogonal to the third direction via one or more second rotational actuators disposed on the second stand; and a second optical sensor disposed on the second support member or the second stand; and further comprising a processor disposed in electrical communication with the first and second optical sensors and the one or more first and second rotational actuators, the processor configured to:

receive first optical input from the first optical sensor;

receive second optical input from the second optical sensor;

process the first optical input to target recognition of a left human ear, and to determine a first target direction pointing toward the left human ear;

process the second optical input to target recognition of a right human ear, and to determine a second target direction pointing toward the right human ear;

command the one or more first rotational actuators to rotate the first parabolic sound reflecting body so that the first direction coincides with the first target direction; and command the one or more second rotational actuators to rotate the second parabolic sound reflecting body so that the third direction coincides with the second target direction.

9. The system of claim 8, wherein amplitudes are constructively additive for a first predetermined base frequency and one or more harmonics thereof of the sound generated by the first speaker in the first direction and the sound generated by the first speaker in the second direction and reflected from the first parabolic sound reflecting body; and amplitudes are constructively additive for a second predetermined base frequency and one or more harmonics thereof of the sound generated by the second speaker in the third direction and the sound generated by the second speaker in the fourth direction and reflected from the second parabolic sound reflecting body.

10. The sound generating system of claim 9, wherein:

the first predetermined base frequency is in a range of frequencies from about 100 Hz to about 1200 Hz;

the second predetermined base frequency is in a range of frequencies from about 100 Hz to about 1200 Hz; and the first predetermined base frequency and the second predetermined base frequency are different frequencies, wherein the difference between the first and second base frequencies is less than or equal to 50 Hz.

11. The sound generating system of claim 10, wherein:

the first predetermined base frequency is about 428 Hz; and the second predetermined base frequency is about 436 Hz.

* * * * *